Oct. 30, 1962 W. PICKEN 3,060,587
PIPE BENDING GAUGE
Filed Jan. 18, 1961 6 Sheets-Sheet 1

INVENTOR.
William Picken,
BY
Richards and Cifelli,
Attorneys

Oct. 30, 1962 W. PICKEN 3,060,587
PIPE BENDING GAUGE
Filed Jan. 18, 1961 6 Sheets-Sheet 4

INVENTOR.
William Picken,
BY Richards and Gifelli,
Attorneys

Oct. 30, 1962 W. PICKEN 3,060,587
PIPE BENDING GAUGE
Filed Jan. 18, 1961 6 Sheets-Sheet 5

Fig.15

INVENTOR.
William Picken,
BY Richards & Cifelli,
Attorneys

United States Patent Office 3,060,587
Patented Oct. 30, 1962

3,060,587
PIPE BENDING GAUGE
William Picken, 2415 41st St., Long Island City, N.Y.
Filed Jan. 18, 1961, Ser. No. 83,532
15 Claims. (Cl. 33—174)

This invention relates to a novel pipe bending gauge for use in connection with hydraulic or other power actuated bending apparatus, and especially for use in bending pipes or conduits of larger diameters, e.g. from two to six or more inches in diameter.

In the power bending of pipes or conduits, and especially those of larger diametric sizes, it is usually the practice to effect progressive bending by shifting the pipe or conduit lengthwise, step by step, relative to a power actuated bending apparatus, whereby to effect successive individual bends, each comprising an increment of selected angular extent, progressive accumulation of which increments produces a completed angular bend, e.g. of ninety degrees or less. In such practice, although the interval distance of progressive pipe or conduit shift steps can be marked on the pipe or conduit for successive alignment with the plunger of the bending apparatus, whereby to produce successive increments of bend, there is always risk that under or over bending at individual steps may occur, with resultant undesirable, and sometimes destructive, deformation of the pipe or conduit.

Having the above in view, it is an object of this invention to provide a gauge adapted to be attached to a pipe or conduit undergoing bending operations, whereby not only to indicate and determine selected degree increments of successive bending steps, but also to limit such bending steps against over or under bending, thereby to assure a completed bend of desired total degree without risk of pipe or conduit deformation.

This invention has for a further object to provide a pipe bending gauge which, in addition to its use for controlling successive bending steps, may also be used for positioning a pipe or conduit, which has been provided with a first bend, for production of a second bend in a plane selectively angular to the plane of said first bend; such second bend being frequently advantageous in an electric wire or cable housing conduit with respect to which it is desirable, as far as possible, to avoid use of couplings.

The above and other objects will be understood from a reading of the following description of this invention with reference to the accompanying drawings showing an illustrative embodiment thereof, in which drawings.

Like characters of reference are employed in the above described views, to indicate corresponding parts.

Referring to the drawings, the reference character P indicates a pipe or conduit subject to a power bending operation.

The bending gauge of this invention includes a protractor device 10, which is preferably of substantially semicircular conformation. This protractor device comprises superposed spaced apart top and bottom plates 11 and 12 which are joined together by bolts 13 passing through spacing sleeves 14 (see FIG. 7). Disposed between the plates 11 and 12, and centrally pivoted in connection therewith, by a pivot bolt 15, are oppositely extending radial socket arms 16 and 17, each being provided with an outwardly open socket 18 to receive means (hereinafter described) by which the protractor device 10 is operatively supported in connection with a pipe or conduit P to be bent.

The left hand socket arm 16 is swingable clockwise about its pivotal connection relative to graduations indicating selected degree increments determinative of successive pipe or conduit bending steps. These graduations preferably comprise series of aligned perforations with which the left hand sectors of the plates 11 and 12 are provided in extension along the marginal portions thereof, and which are concentric to the pivotal connection 15 about which the socket arm 16 is swingable. These graduations begin at a horizontal base line which is parallel to the bottom 19 of the protractor device 10 and which intersects the pivotal connection of the socket arm 16 with the latter. Illustratively, these graduations are provided by a plurality of rows of said perforations, comprising one row 20 with perforations angularly spaced apart a selected number of degrees e.g. 4½°; a next row 21 with perforations angularly spaced apart another selected number of degrees, e.g. a distance of 3°; another row 22 with perforations angularly spaced apart another selected number of degrees, e.g. 2½°; and a further row 23 with perforations angularly spaced apart still another selected number of degrees, e.g. 2°. Of course it will be understood that the angular spacing of the graduations or perforations of the respective rows thereof can be varied as may best be suited to desired progressive, step by step, pipe or conduit bending operations, and that the number of such rows may be more or less than illustratively shown; the object being to selectively predetermine the extent of bend in successive pipe or conduit bending steps as may be preferable in any given case. Said rows of graduations or perforations preferably terminate at a line 90° distant from the base line at which they begin.

Provided in the right hand sectors of the plates 11 and 12 of the protractor device 10 are a series of slots 24, 25, 26 and 27 (see FIG. 5) which correspond to and are circumferentially aligned with the described respective rows of perforations 20, 21, 22 and 23. Said slots extend downwardly from the base line which is parallel to the bottom 19 of the protractor device 10 and which intersects the pivotal connection 15 of the socket arm 17. Said slots respectively correspond in length to the angular spacing of the perforations of the respective rows 20, 21, 22 and 23.

The means for operatively supporting the protractor device 10, in connection with the pipe or conduit 10 to be bent, comprises a left hand carrier rod or bar 30, the inner end portion of which is entered in the socket 18 of the left hand socket arm 16 of the protractor device, and detachably secured thereto by a coupling pin 31 passed therethrough, and a right hand carrier rod or bar 32, the inner end portion of which is entered in the socket 18 of the right hand socket arm 17 of the protractor device 10, and detachably secured thereto by a coupling pin 33 passed therethrough.

The left hand carrier rod or bar 30 extends to and is engaged with a left hand pipe or conduit gripping member or clamp 34 which is attached to and supported by the pipe or conduit P in longitudinally off-set relation to the left of the protractor device 10. The right hand carrier rod or bar 32 extends to and is engaged with a right hand pipe or conduit gripping member or clamp 35, which is attached to and supported by the pipe or conduit P, in longitudinally off-set relation to the right of the protractor device 10.

The left hand pipe or conduit gripping member or clamp 34 (see detail FIGS. 3 and 4) comprises an inverted V-shaped jaw 36 of suitable length which is adapted to straddle the pipe or conduit P. Affixed to said jaw 36, to upstand therefrom, are longitudinally spaced apart, transverse standard plates 37, to and between which extends a longitudinal tubular coupler 38. The free outwardly extending portion of the left hand carrier rod or bar 30 is slidably engaged through said tubular coupler 38, so as to be supported thereby in non-rotative relation thereto. Any suitable means may be provided to non-rotatably relate the carrier rod or bar 30 to said tubular coupler 38. To this end, these parts are preferably of rectangular cross-sectional shape. Affixed to one of the standard plates 37 is a transverse spirit level member 39, by means of which the gripping member or clamp 34 is attached to the pipe or conduit P. Such means, as illustratively shown, comprises a transverse anchor bar 40 which is affixed to one side of the V-shaped jaw 36, with its inner end portion projecting freely beyond the peak or ridge of said jaw, thereby providing a perforate keeper lug 41, and its outer end terminating in an anchoring hook 42. This hook 42 receives one end of a binder chain 43 which is adjustably attached thereto. This chain is adapted to be passed around the bottom side of the pipe or conduit P, and to the opposite end thereof is connected a coupler bolt 44 which extends upwardly over the opposite side of the V-shaped jaw 36. Said coupler bolt is provided with a screw-threaded free end portion which is adapted to be passed through the perforate keeper lug 41 of the anchor bar 40, whereby to receive a lock nut 45. It will be obvious that by screwing home said lock nut, the coupler bolt 44 will be drawn upwardly, thereby to tighten the binder chain 43 in gripping engagement with the pipe or conduit P, thus securely binding the gripping member or clamp 34 in operative attached relation to the pipe or conduit P.

Figure 8:
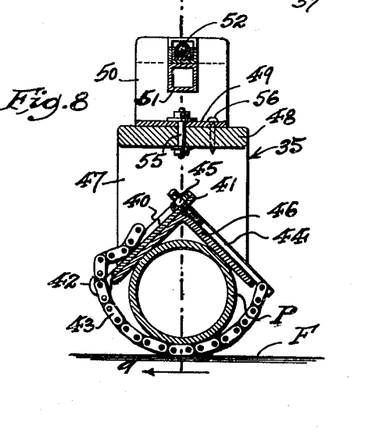
FIG. 8 is a cross-sectional view, taken on line 8—8 in FIG. 2, but drawn on an enlarged scale.
Figure 9:
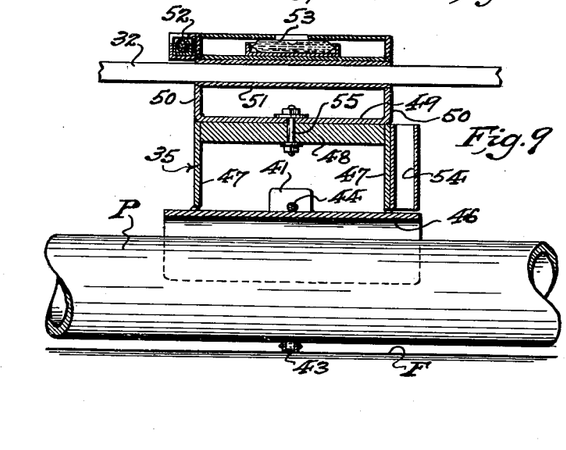
FIG. 9 is a fragmentary longitudinal sectional view, taken on line 9—9 in FIG. 8.

The right hand pipe or conduit gripping member or clamp 35 may, in a simplified form of the bending gauge, correspond to that of the gripping member or clamp 34 above described. Another and preferred form of said gripping member 35, as shown (see detail FIGS. 8 and 9), in the use of which additional operating functions are available, also comprises an inverted V-shaped jaw 46 which is adapted to straddle the pipe or conduit P to be bent. Affixed to said jaw 46, to upstand therefrom, are longitudinally spaced apart, transverse standard plates 47, which are of reduced height as compared with the standard plates of the gripping member 34. To and between the top ends of said standard plates 47 is affixed a longitudinal bridge piece 48. Supported by said bridge piece is a yoke formed by a base 49 having upstanding longitudinally spaced apart, transverse standard plates 50, to and between which extends a longitudinal tubular coupler 51. The free outwardly extending portion of the right hand carrier rod or bar 32 is slidably engaged through the tubular coupler 51, so as to be supported thereby in non-rotative relation thereto; these parts, to this end, being preferably of rectangular cross-sectional shape. Affixed to a standard plate 50 of the yoke, preferably to the inner one, is a transverse spirit level 52, by means of which the gripping member or clamp 35 can be adjusted to its operative attached relation to the pipe or conduit P, perpendicular to the axis of the latter, and so as to position the carrier rod or bar 32 parallel to said axis. Additionally a longitudinally disposed spirit level 53 may also be mounted between the standard plates 50 of the yoke. Affixed to the outer standard plate 47 of the V-shaped jaw 46 is a vertical tubular socket member 54, the purpose of which will be hereinafter explained. The yoke is pivotally connected to the bridge piece 48 by a central pivot bolt 55, so that, for purposes subsequently described, said yoke may be rotated relative to the V-shaped jaw 46. Normally the yoke is releasably locked against rotation by a removable lock pin 56, which can be engaged through the yoke base 49 and bridge piece 48 (see FIG. 8). The gripping member or clamp 35 is provided with means for releasably affixing the same to the pipe or conduit P, said means corresponding to that with which the gripping member or clamp 34 is provided, therefore comprising an anchor bar 40 having the perforate keeper lug 41 and anchoring hook 42, and a binder chain 43 having the coupler bolt 44 and lock nut 45.

Figures 5, 6, 7:
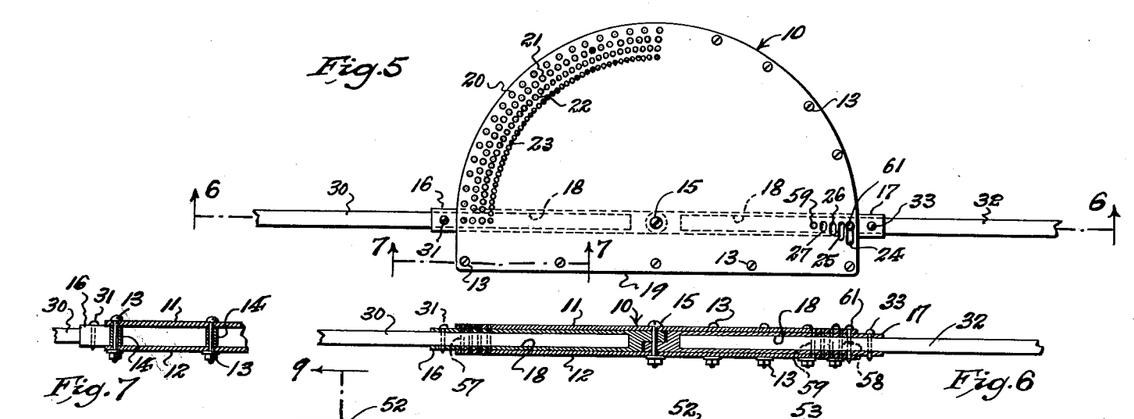
FIG. 5 is an enlarged plan view of the protractor device of the bending gauge.
FIG. 6 is a longitudinal sectional view of the same, taken on line 6—6 in FIG. 5.
FIG. 7 is a fragmentary longitudinal sectional view, taken on line 7—7 in FIG. 5.

As shown in FIG. 6, the socket arm 16 and carrier rod or bar 30 engaged therein are provided with a group of aligned openings 57 corresponding to the rows 20, 21, 22 and 23 of the degree spaced perforations of the protractor device 10. Similarly, the socket arm 17 and carrier rod or bar 32 engaged therewith are provided with a group of aligned openings 58 corresponding to the slots 24, 25, 26 and 27 of said protractor device 10.

In use, the pipe or conduit bending gauge of this invention is mounted on a pipe or conduit P to be bent by means of the gripping members or clamps 34 and 35 which are releasably affixed to the latter, so that the carrier rods or bars 30 and 32 extending therefrom will support the protractor device 10 horizontally above said pipe or conduit. The pipe or conduit P, with the relatively supported bending gauge, is then engaged with a power bender apparatus, so as to be between its ram R and its backing shoes S; these parts of the bender apparatus being shown by broken lines in FIGS. 1, 2, 10, 11, 12 and 15. The assembly thus arranged is supported on a bench or other floor surface F, whereupon the bending operations can be proceeded with.

Figure 1:
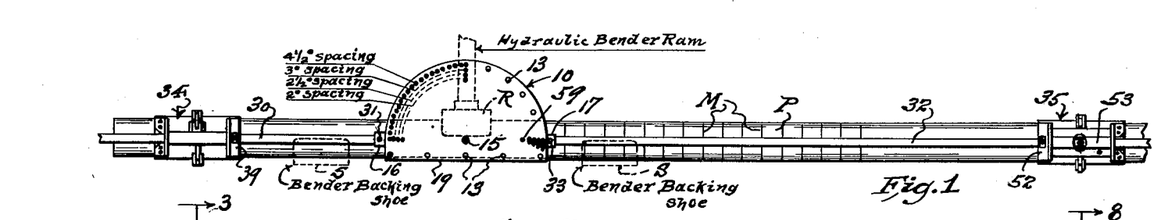
FIG. 1 is a top plan view of a pipe or conduit equipped with the bending gauge of this invention preparatory to a power bending operation.
Figures 2, 3, 4:
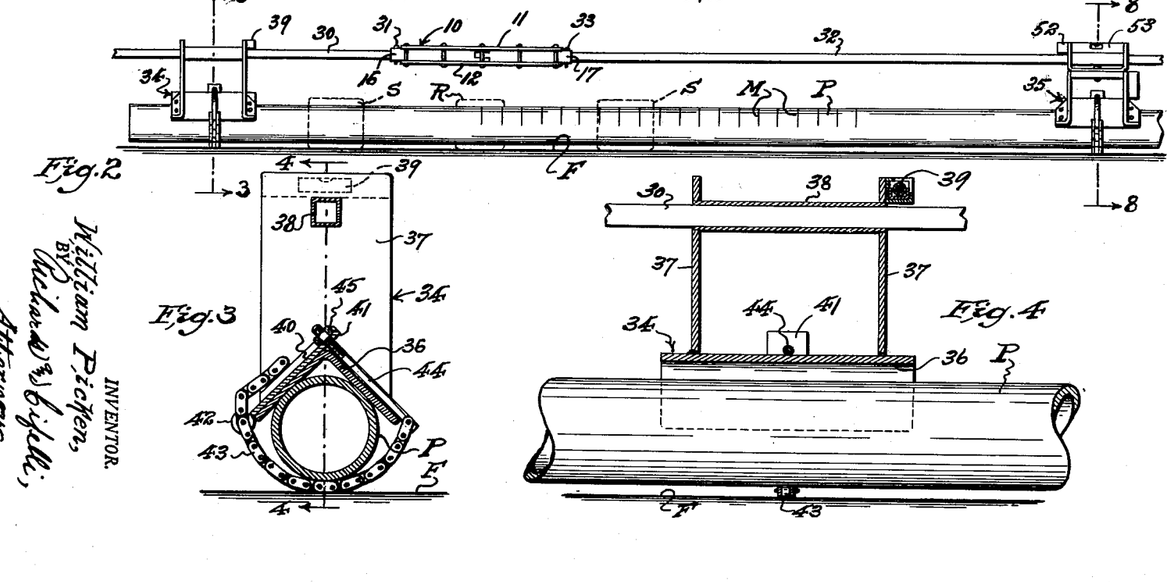
FIG. 2 is a side elevational view of the same.
FIG. 3 is a cross-sectional view, taken on line 3—3 in FIG. 1, but drawn on an enlarged scale.
FIG. 4 is a fragmentary longitudinal sectional view, taken on line 4—4 in FIG. 3.

The pipe or conduit P is so positioned that the beginning point or start of a bend desired to be formed therein is opposed to the ram R, with the center point of the protractor device 10 aligned with the latter (see FIGS. 1 and 2). It may here be pointed out that the distance of longitudinal shifts of the pipe, required to accommodate it to a succession of progressive bending steps, to which said pipe or conduit is to be subjected, can be indicated by suitably spaced distance indicating marks M with which the pipe or conduit is provided.

Figure 10:
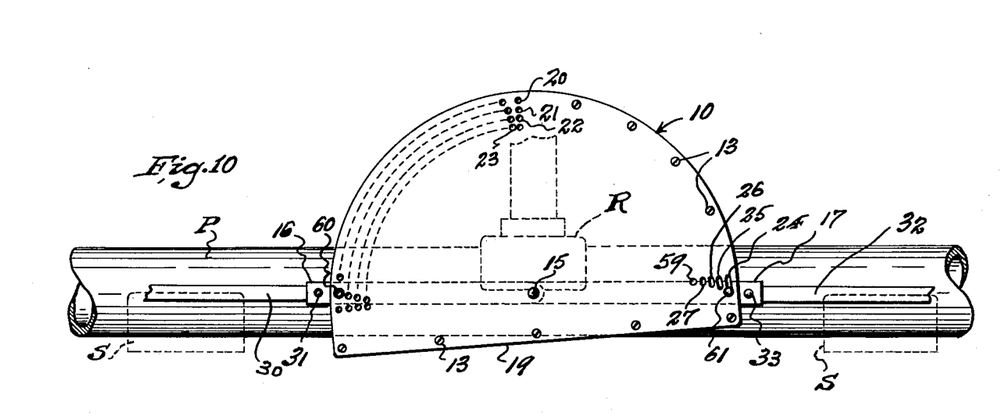
FIG. 10 is an enlarged fragmentary plan view of the protractor device of the bending gauge as adjusted preparatory to producing a first step of a pipe or conduit bending operation.
Figure 11:
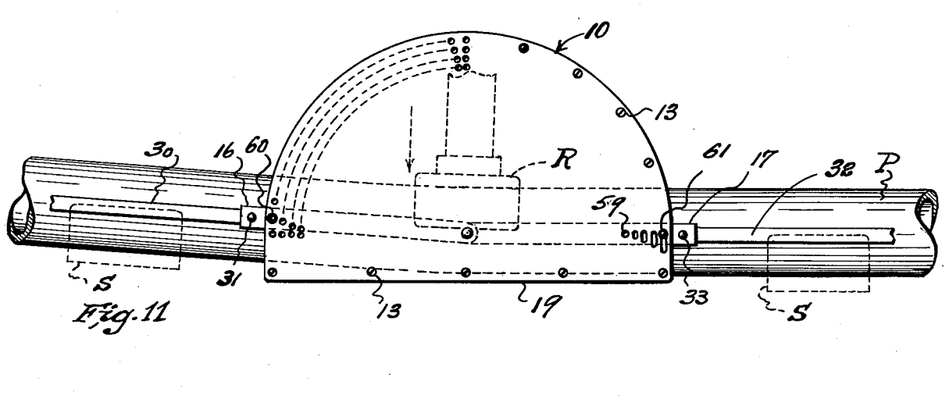
FIG. 11 is a similar view, showing completion of said pipe bending operation.

The assembly of pipe or conduit and bending gauge being disposed in its aforesaid initial position, if the bending steps are to be of a scope e.g. of 4½°, the protractor device 10 is rotatably shifted from the first to the second 4½° spaced perforations of line 20 thereof, so as to align the socket arm 16 and carrier rod or bar 30 with said second perforation, whereupon a removable locking pin 60 is passed through the protractor device and said socket arm and carrier rod or bar (see FIG. 10). Another locking pin 61 is passed through slots 24 of the protractor device 10 and the other socket arm 17 and carrier rod or bar 32, said locking pin 61 being then disposed to abut the bottom ends of said slots 24 (again see FIG. 10). This having been done the assembly is ready for performing a first pipe or conduit bending step. This first beinding step is accomplished by operating the ram R of the power bender apparatus. By such operation the bend is limited to a 4½° step by movement of the locking pin 61 upwardly through the protractor device slots 24, so as to be stopped against the upper ends thereof (see FIG. 11), thereupon stopping the power bender apparatus and thus completing a first bending step.

Figure 15:
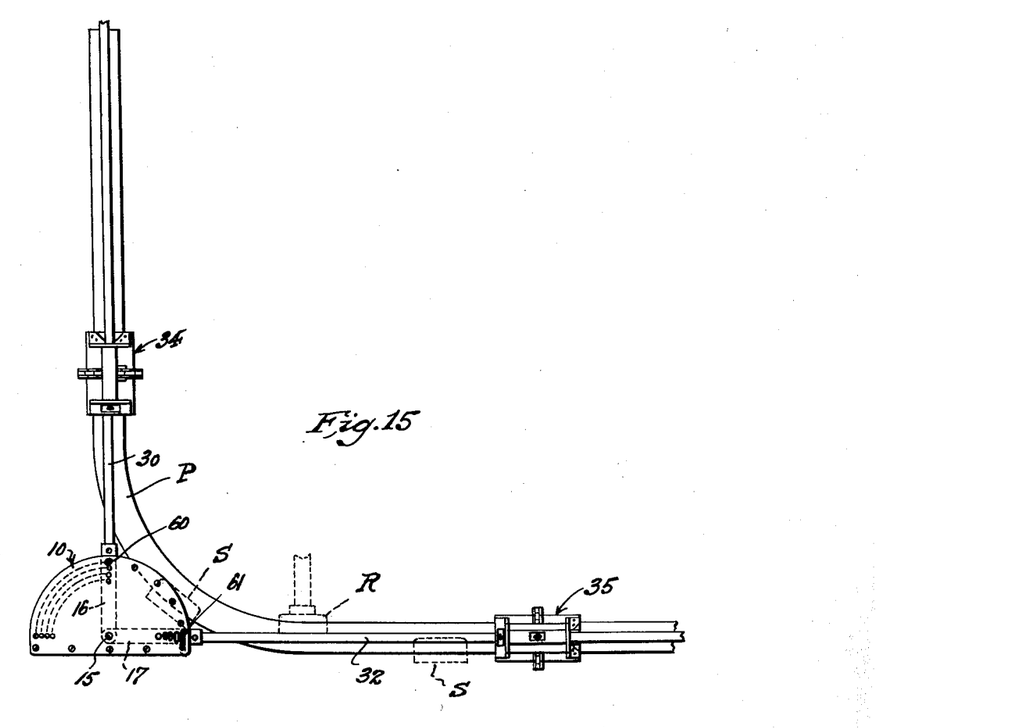
FIG. 15 is a top plan similar to that of FIG. 1, but showing completion of a ninety degree bend produced in the pipe or conduit.

Progressive bending steps can be successively effected by shifting the pipe or conduit P longitudinally from shift distance mark to mark M thereof relative to the ram R of the power bender apparatus, and by rotating the protractor device 10 step by step from perforation to perforation of the selected row thereof, accompanied by corresponding relocation of the locking pin 60, and intervening operation of the ram R, until a total bend of desired degree is attained, such e.g. as a 90° bend shown in FIG. 15.

It will be understood that the pipe or conduit bending steps may be limited in extent by selectively utilizing the perforations of any of the several rows 20, 21, 22 and 23 thereof. It will also be understood that the extent of a desired completed or total bend may be attained by utilization of a combination of the perforations selected from the several rows 20, 21, 22 and 23 thereof.

Figures 12, 13, 14:
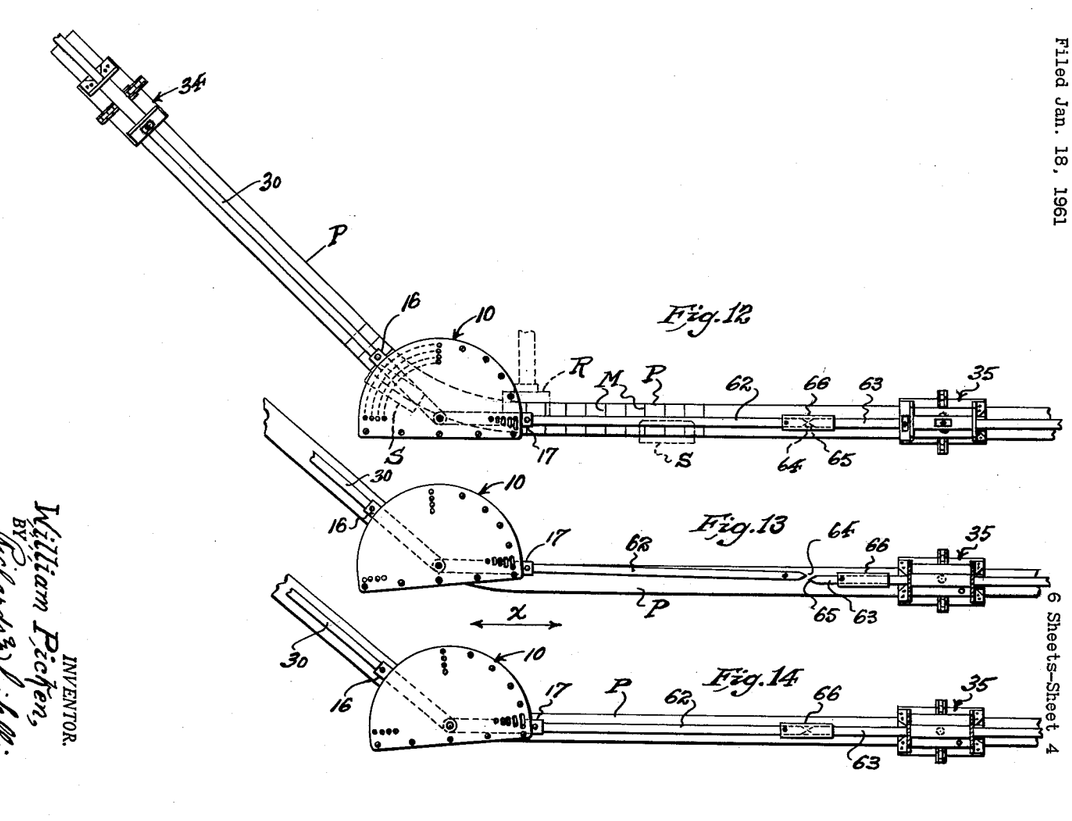
FIG. 12 is a top plan view of a pipe or conduit equipped with a modified form of the bending gauge of this invention, the pipe or conduit being shown at a stage in the course of a bending operation.
FIGS. 13 and 14 are similar views showing operational adjustments of said modified form of the bending gauge.

Referring now to FIGS. 12, 13 and 14, there is shown therein a modified form and construction of the carrier rod or bar for extension between the protractor device 10 and the pipe or conduit gripping member or clamp 35. In this modified arrangement, said carrier rod or bar comprises a section 62 adapted to extend from the socket arm 17 of the protractor device 10, and a section 63 adapted to extend from the gripping member or clamp 35. The free ends of these sections 62 and 63 are respectively provided with indexing pointer ends 64 and 65. Telescopically and slidably mounted on and for cooperation with said sections 62 and 63 is a coupling sleeve 66. Use of this modified form of carrier rod or bar structure is found to be of advantage, especially in the making of bends of large angular degree.

In the use of the aforesaid modified form of the carrier rod or bar structure, upon completion of a bending step, the coupling sleeve 66 is retracted to the position thereof shown in FIG. 13, thus disconnecting the sections 62 and 63. The pipe or conduit P is then shifted longitudinally preparatory to performance of a next bending step. If after this, the section 62 is out of alignment with the section 63, as shown in FIG. 13, the locking pin 56 (see FIG. 8), which locks the yoke of the gripping member or clamp 35 to the V-shaped jaw 46 thereof, is removed, so that said yoke may be rotated about the pivotal connection 55 to bring the index pointer ends 64 and 65 of the rod or bar sections 62 and 63 into registration, thereby to align said sections, subject to coupling thereof together by the sleeve 66. If the thus aligned sections 62 and 63 are not then disposed in normal parallel relation to the axis of the unbent portion of the pipe or conduit P, it will indicate that the protractor device 10 is not properly positioned relative to the next zone of bend as centered in opposition to the ram R of the power bender apparatus. To bring the protractor device to proper position, the same may be shifted, in one direction or the other (see arrow X, FIG. 13), until the aligned sections 62 and 63 are disposed parallel to the axis of said unbent portion of the pipe or conduit. Such movement rotates the yoke of the gripping member or clamp 35 back to normal position, whereupon it can be again locked to the jaw 46 by reengaging the locking pin 56 therewith. The next bending step may now be carried out (see FIG. 12).

Figures 16, 17, 18:
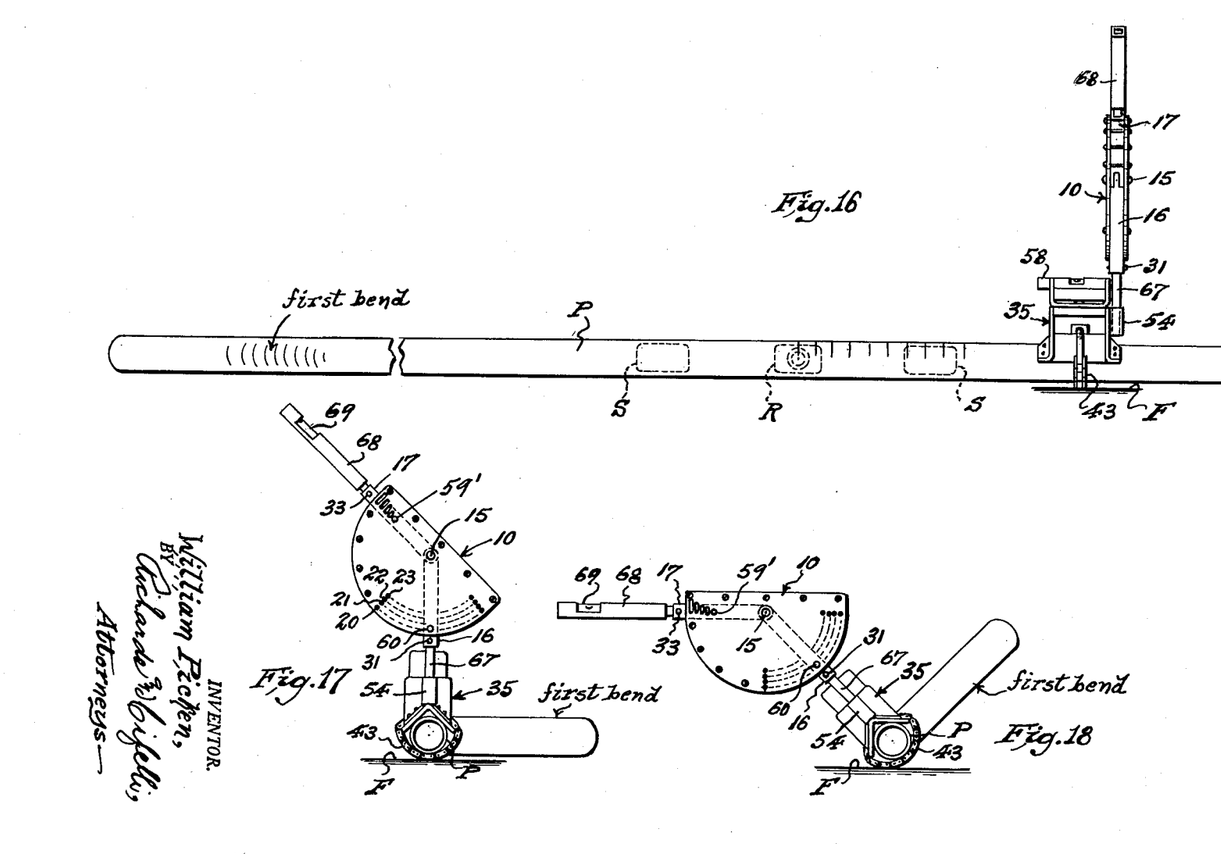
FIG. 16 is a side elevational view of a pipe or conduit provided with a first bend, and having the protractor device of the gauge mounted thereon ready for manipulation to roll the bent pipe or conduit so as to position the same for production of a second bend therein.
FIG. 17 is an end elevational view, viewed from the right of FIG. 16.
FIG. 18 is a view similar to that of FIG. 17 showing the initially bent pipe or conduit rolled to a position preparatory to producing a desired second bend therein.

Referring next to FIGS. 16, 17 and 18, there is shown therein another use for the protractor device 10 of the bending gauge of this invention. It is sometimes desirable to produce a second bend in the pipe or conduit P, after a first bend is formed therein, and it also may be desirable that the second bend be disposed to lie in a plane angular to the plane of the first bend. In the latter case it is necessary to roll the pipe or conduit, after a first bend is produced therein, relative to the ram R and shoes S of the power bender apparatus, before proceeding to form said second bend. The protractor device 10 may be used to effect such rolling of the pipe or conduit to a desired predetermined angular degree.

For such use, the protractor device 10 is disconnected and separated from the carrier rods or bars 30 and 32. To the socket arm 16 of the separated protractor device 10 is then affixed, by the locking pin 31, a standard arm or post 67. This standard arm or post 67 is entered in the socket member 54 of the gripping member or clamp 35, which is bound to the unbent rear section of the pipe or conduit P, to upstand from the latter so as to support the protractor device 10 in a vertical plane transverse to the axis thereof; the pipe or conduit being held against rotation by applied gripping action of the ram and shoes of the bender apparatus. To the socket arm 17 of the protractor device is affixed, by the locking pin 33, an outwardly extending lever arm 68, this arm being provided with a spirit level 69 mounted therein for exposure at the top side thereof. The socket arm 17 is locked to the protractor device, against swinging movement relative thereto, by a locking pin 59' (see FIGS. 17 and 18), which is engaged through the opening 59 with which these parts are provided (see FIGS. 5, 6, 10 and 11).

Preparatory to rolling the pipe or conduit P, the protractor device 10 is rotated to a selected angular position relative to the supported socket arm 16, according to the desired angular disposition of the second bend to be formed relative to the previously formed first bend therein. Such adjustment is made by moving the socket arm 17 into registration with a selected degree perforation of one of the rows 20, 21, 22 or 23 thereof with which the protractor device is provided. Such adjustment is illustratively shown as one of 45°. When so adjusted the protractor device and socket arm 16 are locked together by means of a locking pin 60.

To roll the pipe or conduit P, the gripping thereof by the ram R and shoes S of the bender apparatus is relaxed, whereupon the operator grasps and swings down the lever arm 68 until the spirit level 69 indicates a level condition of said lever arm (see FIG. 18). By this operation, the gripping member or clamp 35, and the pipe or conduit P bound thereto, are rolled to a selected angular degree, whereupon the ram R and shoes S of the bender apparatus are again caused to grip and hold the pipe or conduit P against rotative displacement from its attained rolled position.

The pipe or conduit P being so positioned and held, the binder chain 43 of the gripping member or clamp 35 is relaxed to permit rotation of said gripping member or clamp relative to the positioned pipe or conduit, whereafter said gripping member or clamp 35 can be rotated relative to the pipe or conduit, to a normal upstanding and perpendicular relation to the axis of the pipe or conduit, such position being determined by the level indicating condition of the spirit level 58 with which the gripping member or clamp 35 is provided. The upstanding position of the gripping member or clamp 35 being thus resumed, the bender chain 43 of said gripping member or clamp is again tightened to its normal holding relation to the pipe or conduit P. After this, the protractor device can be removed from the gripping member or clamp 35, and returned to operative connected and supported relation to and between the carrier rod or bars 30 and 32, after which the operation of forming a desired second bend in the pipe or conduit P may be proceeded with, in the manner already described with respect to the production of a first bend.

Although this invention has been described by making specific reference to a preferred embodiment thereof, such description is to be understood as illustrative and not limiting, since many changes may be made in the parts, their relative arrangements and combinations, without departing from the scope of the invention as defined by the here following claims.

I claim:

1. A pipe bending gauge for use in association with power actuated bender apparatus, said gauge comprising a protractor device having centrally pivoted oppositely extending socket arms, carrier bars extending respectively from said socket arms, pipe gripping members adapted to be releasably affixed to a pipe to be bent in respectively longitudinally spaced away relation to opposite sides of the protractor device, the respective gripping members having means to slidably receive the respective carrier bars, whereby to support the protractor device relative to the pipe at a zone of bending pressure to be applied thereto, the protractor device having at one side thereof, and concentric with the pivotal connection of the socket arms therewith, at least one row of graduations indicating selected angular increments determinative of successive pipe bending steps and at the other side thereof at least one bending step limiting slot corresponding in length to the selected angular increment of a pipe bending step, means to successively interlock one socket arm with the protractor device relative to said graduations, and means to interengage the other socket arm with the protractor device for cooperation with the bending step limiting slot of the latter.

2. A pipe bending gauge according to claim 1, wherein the pipe gripping members each comprise an inverted V-shaped jaw adapted to straddle the pipe to be bent, said jaw supporting the means to slidably receive a carrier bar, a binder chain extending from said jaw around said pipe, and means to releasably tighten the chain relative to the pipe, whereby to bind the gripping member to the latter.

3. A pipe bending gauge according to claim 1, wherein the pipe gripping members each comprise an inverted V-shaped jaw adapted to straddle the pipe to be bent, said jaw supporting the means to slidably receive a carrier bar, a binder chain extending from said jaw around said pipe, means to releasably tighten the chain relative to the pipe, whereby to bind the gripping member to the latter, and spirit level means to determine operative position of the gripping member on the pipe perpendicular to the axis thereof.

4. A pipe bending gauge for use in association with power actuated bender apparatus, said gauge comprising a protractor device having centrally pivoted oppositely extending socket arms, carrier bars extending respectively from said socket arms, pipe gripping members adapted to be releasably affixed to a pipe to be bent in respectively longitudinally spaced away relation to opposite sides of the protractor device, the respective gripping members having means to slidably receive the respective carrier bars, whereby to support the protractor device relative to the pipe at a zone of bending pressure to be applied thereto, the protractor device having at one side thereof, and concentric with the pivotal connection of the socket arms therewith, at least one row of perforate graduations indicating selected angular increments determinative of successive pipe bending steps, one socket arm having an opening successively alignable with said perforate graduations, a removable locking pin engageable through said opening and successive perforate graduations to operatively interengage said socket arm with the protractcor device, the protractor device having at the other side thereof at least one bending step limiting slot corresponding in length to the selected angular increment of a pipe bending step as determined by said perforate graduations, the other socket arm having an opening alignable with said slot, and another removable locking pin engageable through the latter opening and said slot, whereby to operatively interengage said other socket arm with the protractor device.

5. A pipe bending gauge according to claim 4, wherein the protractor device is provided with a plurality of concentrically spaced rows of perforate graduations, the perforate graduations of each row being spaced apart a different number of degrees, and wherein the protractor device is further provided with a plurality of bending step limiting slots respectively corresponding to the respective rows of said perforate graduations, and to the respective angular intervals of the latter, the respective socket arms cooperative with said rows of perforate graduations and with said slots each having a plurality of locking pins receiving openings registrable therewith.

6. A pipe bending gauge according to claim 4, wherein the pipe gripping members each comprise an inverted V-shaped jaw adapted to straddle the pipe to be bent, said jaw supporting the means to slidably support a carrier bar, a binder chain extending from said jaw around said pipe, and means to releasably tighten the chain relative to the pipe, whereby to bind the gripping member to the latter.

7. A pipe bending gauge according to claim 4, wherein the pipe gripping members each comprise an inverted V-shaped jaw adapted to straddle the pipe to be bent said jaw supporting the means to slidably support a carrier bar, a binder chain extending from said jaw around said pipe, means to releasably tighten the chain relative to the pipe, whereby to bind the gripping member to the latter, and spirit level means to determine operative position of the gripping members on the pipe perpendicular to the axis thereof.

8. A pipe bending gauge for use in association with power bender apparatus, said gauge comprising a semicircular protractor device having centrally pivoted, oppositely extending radial socket arms provided by a left hand socket arm and a right hand socket arm, said arms being adapted to be normally diametrically disposed relative to the protractor device, a carrier bar attached to and extending from said left hand socket arm, a left hand pipe gripping member adapted to be releasable affixed to a pipe to be bent in spaced away relation to the left hand side of the protractor device and having means to slidably receive and support said carrier bar, a second carrier bar attached to and extending from the right hand socket arm, a right hand pipe gripping member also adapted to be releasably affixed to the pipe to be bent is spaced away relation to the right hand of the protractor device, said right hand gripping member having means rotatable in a plane parallel to the plane of the protractor device to slidably receive said second carrier bar, said second carrier bar comprising two sections having opposed indexing pointer ends and a slidable coupling sleeve to releasably couple together said sections in aligned relation, means to releasably secure said rotatable second carrier bar receiving means of said right hand pipe gripping member against rotation, the protractor device having at least one row of perforate graduations indicating selective angular increments determinative of successive pipe bending steps relative to which said left hand socket arm is rotatable, said left hand socket arm having an opening successively alignable with said perforate graduations, a removable locking pin engageable through said opening and successive perforate graduations to operatively engage said left hand socket arm with the protractor device, the protractor device having at least one bending step limiting slot corresponding in length to the selected angular increment of a pipe bending step as determined by said perforate graduations, said right hand socket arm having an opening alignable with said slot, and another removable locking pin engageable through the latter opening and said slot, whereby to operatively interengage the right hand socket arm with the protractor device.

9. A pipe bending gauge according to claim 8, wherein the protractor device is provided with a plurality of concentrically spaced rows of perforate graduations, the perforate graduations of each row being spaced apart a different number of degrees, and wherein the protractor device is further provided with a plurality of bending step limiting slots, respectively corresponding to the respective rows of said perforate graduations, and to the respective angular intervals of the latter, said left hand and right hand socket arms respectively cooperative with said rows of perforate graduations and with said slots each having a plurality of locking pin receiving openings registrable therewith.

10. A pipe bending gauge according to claim 8, wherein the pipe gripping members each comprise an inverted V-shaped jaw adapted to straddle the pipe to be bent, said jaw supporting the means to slidably support a carrier bar, a binder chain extending from said jaw around said pipe, and means to releasably tighten the chain relative to the pipe, whereby to bind the gripping member to the latter.

11. A pipe bending gauge according to claim 8, wherein the pipe gripping members each comprise an inverted V-shaped jaw adapted to straddle the pipe to be bent, said jaw supporting the means to slidably support a carrier bar, a binder chain extending from said jaw around said pipe, and means to releasably tighten the chain relative the pipe, whereby to bind the gripping member to the latter and spirit level means to determine operative position of the gripping members on the pipe perpendicular to the axis thereof.

12. A pipe bending gauge for use in association with power bender apparatus including a semi-circular protractor device having centrally pivoted, oppositely extending, radial socket arms normally diametrically disposed relative thereto, and a pipe gripping member adapted to be releasably affixed to a pipe to be bent, said gripping member having a perpendicular socket member at one end and a spirit level means to determine a normal upstanding relation of said gripping member to said pipe, means to interlock one socket arm to the protractor device in its normal diametric disposition, a standard post adapted to be affixed to said one socket arm for insertion in said socket member, whereby to support the protractor device in a transverse vertical plane above said pipe, said protractor device having a row of angular degree graduations concentric to the pivotal connection of the other socket arm with the protractor device and with which said other socket arm is cooperative, means to interlock said other socket arm relative to said row of graduations in selected angular extension from the protractor device, a lever arm adapted to be affixed to said other socket arm, and said lever arm having spirit level means for determining movement of said lever arm and protractor device adapted to roll said pipe to a predetermined angular degree.

13. In a pipe bending gauge according to claim 12, wherein the pipe gripping member includes a V-shaped jaw adapted to straddle the pipe to be bent, a binder chain extending from said jaw around said pipe, and means to releasably tighten said chain relative to said pipe, whereby to bind said gripping member to the latter.

14. A pipe bending gauge for use in association with power bender apparatus including a semi-circular protractor device having centrally pivoted, oppositely extending, radial socket arms normally diametrically disposed relative thereto, and a pipe gripping member adapted to be releasably affixed to a pipe to be bent, said gripping member having a perpendicular socket member at one end and a spirit level means to determine a normal upstanding relation of said gripping member to said pipe, one socket arm and said protractor device having alignable openings, a locking pin removably engageable through said aligned openings, whereby to interlock said one socket arm to the protractor device in its normal diametric disposition, a standard post adapted to be affixed to said one socket arm for insertion in said socket member, whereby to support the protractor device in a transverse vertical plane above said pipe, said protractor device having a row of perforate angular graduations concentric to the pivotal connection of the other socket arm with the protractor device and with which the latter socket arm is cooperative, said other socket arm having an opening selectively alignable with said perforate graduations, another removable locking pin engageable through said latter opening and a selected perforate graduation, to determine a desired angular position of said other socket arm in extension from the protractor device, a lever arm adapted to be affixed to said other socket arm, and said lever arm having spirit level means for determining movement of said lever arm and protractor device adapted to roll the pipe to a predetermined angular degree.

15. In a pipe bending gauge according to claim 14, wherein the pipe gripping member includes a V-shaped jaw adapted to straddle the pipe to be bent, a binder chain extending from said jaw around said pipe, and means to releasably tighten said chain relative to said pipe, whereby to bind said gripping member to the latter.

References Cited in the file of this patent

UNITED STATES PATENTS

| | | |
|---|---|---|
| 2,334,422 | Zehnus | Nov. 16, 1943 |
| 2,867,261 | Traupmann | Jan. 6, 1959 |

FOREIGN PATENTS

| | | |
|---|---|---|
| 277,622 | Great Britain | Jan. 22, 1925 |